3,846,237
PROCESS FOR PRODUCTION OF CORRINOID COMPOUNDS CONTAINING NO METAL
John I. Toohey, Kingston, Ontario, Canada
(870 Hilgard Ave., Los Angeles, Calif. 90024)
No Drawing. Continuation-in-part of abandoned application Ser. No. 538,893, Mar. 21, 1966, and a division of application Ser. No. 684,640, Nov. 21, 1967, now Patent No. 3,505,311, dated Apr. 7, 1970. This application Sept. 8, 1969, Ser. No. 871,056
The term of this patent subsequent to July 5, 1989, has been disclaimed
Int. Cl. C12d *13/02*
U.S. Cl. 195—28 R                       1 Claim

ABSTRACT OF THE DISCLOSURE

This disclosure describes novel metal-free corrinoid compounds and the preparation of the same from photosynthetic bacteria.

CROSS-REFERENCE TO RELATED APPLICATION

This application is a continuation-in-part of my copending application Ser. No. 538,893, filed Mar. 21, 1966, now abandoned and a divisional of Ser. No. 684,640 filed Nov. 21, 1967 now U.S. Pat. 3,505,311.

BACKGROUND OF THE INVENTION

1. Field of the Invention

The subject of this invention is a class of corrinoid compounds in which there is no metal complexed in the corrin nucleus.

2. Description of the Prior Art

Vitamin $B_{12}$ contains a heterocyclic ring structure in which four nitrogen-containing rings are bound together around a central cobalt atom. According to accepted nomenclature, the heterocyclic ring system (exclusive of cobalt) is called "corrin" and derivatives of this basic structure are called "corrinoid compounds." According to presently accepted information, the corrin structure consists of one pyrrolidine and three pyrroline rings joined in a macro ring containing three bridge carbon atoms and six conjugated double bonds.

Previous to the discovery of the compounds which are the subject of this invention, two classes of corrinoid compounds had been recognized and patents have been issued for both of them. The first group to be discovered was the $B_{12}$ vitamins in which an inorganic ion such as cyanide or hydroxide is linked to the central cobalt atom, as described in U.S. Pats. 2,563,794 and 2,595,499. The second group of corrinoid compounds to be recognized was the $B_{12}$ coenzymes in which a deoxyadenosine (or other organic group) is linked to the cobalt in the same position which is occupied by the inorganic ion in the vitamins, as described in U.S. Pat. 3,037,016. Recently, I have discovered a new class of corrinoid compounds in which the cobalt atom is absent from the corrin nucleus, and which I have described in Proc. Natl. Acad. Sci., 54, p. 934. Previous to this discovery, the corrin ring system had never been obtained without the cobalt atom in it, although numerous investigators had attempted to remove the cobalt from the $B_{12}$ vitamins by various chemical treatments. Other researchers had attempted to synthesize the corrin ring *de novo*, but had found that it is impossible to close the ring without first introducing a metal atom. In fact, it had been generally concluded that the corrin ring system could not exist without a central metal atom.

SUMMARY OF THE INVENTION

My discovery of cobalt-free corrinoid compounds in living organisms has shown that the corrin ring can exist without a metal atom. Since the original discovery, I have obtained several different compounds of this type, all from photosynthetic micro-organisms. It now appears that this class of corrinoid compounds is peculiar to photosynthetic organisms.

The cobalt-free corrinoid compounds have chemical and physical properties (described in detail below) which are quite different from the properties of the cobalt-containing corrinoid compounds. Moreover, the cobalt-containing corrinoid compounds have biological activity for certain micro-organisms and for higher animals (the vitamins have growth-promoting activity and the coenzymes are catalytic in specific enzymatic reactions) while, in contrast, the cobalt-free corrinoid compounds are antagonistic to these activities in the organisms which require the $B_{12}$ vitamins or coenzymes. The particular function of the cobalt-free corrinoid compounds in the photosynthetic organisms is not known but is currently under investigation.

The compounds of this invention are obtained from photosynthetic bacteria, especially those of the genera *Chromatium*, *Rhodospirillum*, *Rhodopseudomonas* and *Rhodomicrobium*. Specific species which have been found suitable are *Chromatium* strain D, *Rhodospirillum rubrum*, *Rhodopseudomonas palustris*, and *Rhodomicrobium vanniellii*. The following is a description of a method for preparing the compounds from these species.

*Chromatium* is grown photosynthetically on a suitable medium such as that described by Arnon et al., Studies on Microalgae and Photosynthetic Bacteria, Plant Cell Physiol. (1963), p. 529. *R. rubrum* is grown either photosynthetically or non-photosynthetically on a medium such as that described by Lascelles, J. Bacter., 62, p. 78 (1956). The cells are collected by centrifugation and stored at −10° C. until used. All subsequent operations are carried out at an illumination not exceeding 10 foot-candles and a pH above 7 is avoided at all times.

1. Ethanol extraction: The cells are extracted twice with 3 volumes of 80% ethanol by homogenizing in a Waring blender for 1 minute at room temperature followed by centrifugation at $10,000 \times g$ for 10 minutes. The combined extract is reduced to one-tenth its original volume by evaporation *in vacuo* at 40° C.

2. Acidification: The pH of the residual aqueous solution is adjusted to 3.5 with 6 N HCl and the resulting precipitate is removed by centrifuging at $10,000 \times g$ for 10 minutes. The solution is neutralized to pH 6.5 using 1 N sodium bicarbonate.

3. Phenol extraction: The water solution is placed in a glass-stoppered centrifuge tube and saturated with phenol at ice-bath temperature by adding 1 ml. of "liquefied phenol" (J. T. Baker Chemical Co.) for each 10 ml. of water. The solution is then extracted 3 times with phenol using 0.5 ml. of liquefied phenol for each 10 ml. of water and centrifuging after each extraction to separate the phases. The combined phenol extract is shaken with exactly one-third its volume of diethyl ether and a small quantity of water. The corrinoid compound remains in the organic phase. The water, which contains a brown-yellow impurity, is discarded. The organic phase is washed twice with water which has been shaken previously with 3 volumes of phenol and 1 volume of ether. The organic phase is then mixed with an equal volume of diethyl ether and the corrinoid compound is extracted into water by three extractions with small quantities of distilled water (about 0.1 ml. of water for each 10 ml. of organic phase). The water solution is freed of phenol by repeated extractions with ether and finally freed of ether by passing nitrogen gas over it at room temperature.

4. Electrophoresis: The water solution is streaked on Whatman 1 paper and subjected to electrophoresis in 0.5 M acetic acid at 30 volts per cm. for 1 hour. The paper is dried in a stream of warm air. The orange bands are cut out and the paper strips are eluted with water by downward percolation.

5. Treatment with Dowex resins: Each eluate containing a neutral or positively charged corrinoid compound is passed through a small column of Dowex-1, 100–200 mesh, x8, in the acetate form, using 5 cc. of resin for each ml. of solution. The corrinoid compound is washed out of the column with water. The eluate is collected in 2 or 3 fractions and the absorption spectrum of each fraction is recorded. The last fraction may require recycling through Dowex-1. The eluate containing the negatively charged corrinoid compound is treated in the same way except that Dowex-1 is replaced by Dowex-50, 100–200 mesh, x8, in the sodium form.

6. Crystallization: Ten volumes of acetone are added to a concentrated water solution of each compound and the mixture is allowed to stand at $-10°$ C. for several days. The mother liquid is drawn off and the crystals are washed with cold acetone.

By this method of isolation five cobalt-free corrinoid compounds have been obtained. The compounds are separated from each other during electrophoresis (step 4). The rate of movement of these compounds with respect to the movement of picric acid and their relative abundance are:

|  |  |  | Percent of total yield from— | |
| --- | --- | --- | --- | --- |
| Charge |  | $R_{picrate}$ | Chromatium | R. rubruam |
| Compound number: |  |  |  |  |
| 1 | Positive | −0.5 | 0.3 | 8 |
| 2 | do | −0.4 | 25 | 15 |
| 3 | do | −0.2 | 2 | 2 |
| 4 | Neutral | 0 | 65 | 60 |
| 5 | Negative | 0.2 | 8 | 15 |

Corrin compound 4 is uncharged over the pH range of 2 to 11, positively charged below pH 1 and negatively charged above pH 11. Corrin compound 5 is negatively charged above pH 2 and positive below pH 1. Corrin compound 2 is positive below pH 6, neutral at pH 6–11 and negative above pH 11. The total yield of corrinoid compounds is about 1 mg. per 100 gm. of *Chromatium* cell paste and 2 mg. per 100 gm. of *R. rubrum* cell paste. Compound 4 has been recrystallized. Other desmetal corrinoids of this type have been found in the extracts of the cells in amounts too small to be characterized fully. The metal-free corrinoid compounds are orange-red in dry form and give aqueous solutions ranging from pale red at low concentration to deep orange-red at high concentration. They are soluble in water, methanol, ethanol, butanol, phenol, and pyridine but insoluble in acetone, ethyl ether, benzene, nitrobenzene, carbon tetrachloride, carbon disulfide and tetrahydrofuran.

All of the cobalt-free corrinoid compounds have identical absorption spectra. The wave lengths of maximum absorption and the corresponding extinctions for a 1 cm. light path through a 1% solution are: 269 m$\mu$ (177), 329 m$\mu$ (261), 377 m$\mu$ (24), 497 m$\mu$ (100), 524 m$\mu$ (107). The complete absorption spectrum for the compounds is disclosed in the article authored by me in Proceedings of the National Academy of Sciences, 54, pp. 934–42. All of the metal-free corrinoids are intensely fluorescent, emitting a brilliant orange light when exposed to ultra-violet radiation. The wave lengths of maximum emission are in the regions of 545 m$\mu$ and 590 m$\mu$.

The metal free corrins exhibit the rotational effect of circular dichroism at 269 m$\mu$, 329 m$\mu$, and in the region of 495 to 525 m$\mu$. The change in molar extinction at 269 m$\mu$ is 22, at 329 m$\mu$ it is 35, and at 495 to 525 m$\mu$ it is 8. The circular dichroism of the metal-free corrins is notably different from that of the $B_{12}$ vitamins in the metal-free corrins lack the rotational effect in the region of 400 m$\mu$ which is quite pronounced in the metal-containing corrins.

Group analysis on compound #4 shows that it contains 1 phosphate, 1 aminopropanol and 1 ribose per molecule. Analysis of positively charged compounds shows that they do not contain phosphate or ribose. Cobalt analysis on 600 $\mu$g. of compound #4 by X-ray fluorescence spectroscopy (sensitive to the cobalt in 60 $\mu$g. vitamin $B_{12}$) gave no indication of the presence of cobalt. Emission spectrum analysis on a sample of 600 $\mu$g. showed the presence of 0.3 $\mu$g. of cobalt which is equal to 1 atom of cobalt per 100 molecules of corrinoid compound and undoubtedly represents a trace contamination by cobalt in the water used for crystallization. Aside from trace amounts of magnesium and calcium, no other metals could be detected by spectrochemical analysis.

Corrin compound 2 is considered to have the structure of descobalt cobinamide and compound 4 is considered to have the structure of descobalt cobamide.

When the cobalt-free corrinoid compounds are exposed to acid (e.g., 0.1 N HC, 100°, 1 hour), to mild alkali (e.g., 0.2 M $NH_4OH$, 100°, 2 minutes) or to strong light (e.g., 2,000 foot-candles for 1 hour) they are converted into yellow products having absorption maxima at 288, 329, and 482 m$\mu$ and a fluorescence maxima at 505 m$\mu$. If the original compounds or the products of the above treatments are exposed to strong alkali (e.g., 0.1 N $N_aOH$, 22°, 1 minute, pH 13) they are converted into yellow products with a broad absorption maximum at 370 to 385 m$\mu$ and a broad shoulder at 270 m$\mu$. The latter yellow products revert to the first yellow products when the solutions are neutralized.

When any of the original cobalt-free corrinoid compounds is mixed with a solution of cobalt ions (e.g., 0.01 M $CoCl_2$) under mildly alkaline conditions (e.g., 0.2 M $NH_4OH$, 100°, 2 minutes) it is converted into a product having the properties of the $B_{12}$ vitamins. The absorption spectrum of the product is identical with that of Factor B (maxima 273, 353, 403, 497 and 527 m$\mu$ at pH 7) and after treatment with cyanide ions (e.g., 0.1 M KCN) the absorption spectrum becomes identical with that of dicyano-Factor B (maxima at 275, 305, 312, 367, 540 and 579 m$\mu$). In the absence of cobalt, the corrins do not react with cyanide. The products of the reaction with cobalt can be reversibly reduced with sodium ascorbate to products with absorption spectrum identical with that of vitamin $B_{12_r}$ ($Co^{++}$) and with potassium borohydride to products with absorption spectrum identical with that of vitamin $B_{12_s}$ ($Co^+$). The cobalt in these products is very firmly bound and shows the same resistance to removal as the cobalt in the $B_{12}$ vitamins.

The cobalt-free corrinoid compounds showed no growth-promoting activity for two of the micro-organisms used to assay vitamin $B_{12}$ (*Lactobacillus leichmannii*) by the method given in U.S. Pharmacopoeia, 15th *ed.*, p. 885 (1955) and *Escherichia coli* 113-3 by the method given by Davis et al., J. Bact. 60, p. 17 (1950). On the contrary, they are inhibitory to the growth-promoting effect of vitamin $B_{12}$ in one of these organisms (*E. coli* 113-3). None of the yellow derivatives described above shows any appreciable activity as a vitamin $B_{12}$ antagonist. After these compounds have taken up cobalt (as in the treatment described above) they then have growth-promoting activity in both test organisms (*L. Leichmannii* and *E. coli*), their activity being equal to that of the known vitamins of the corresponding structures. Tests of compounds 2, 4 and 5 as vitamin $B_{12}$ antagonists in *E. coli* 113-3 supplemented with cyanocobalamin (0.06 mg./ml.) give 50% inhibition indeces as follows:

Compound 2 _____ 2
Compound 4 _____ 15
Compound 5 _____ 40

Similar inhibition indeces have been found with the test organisms *Euglena gracilis* and *Athrobacter duodecadis*. Thus, these compounds exhibit a strong antagonistic effect on the growth response of these organisms.

The cobalt-free corrinoid compounds also compete with vitamin $B_{12}$ for binding sites in gastric juice. Thus, in preliminary tests, 180 nanograms of either compound #2 or compound #4 was found to inhibit the binding of 18 nanograms of vitamin $B_{12}$ to 40% of its normal binding value.

Acid hydrolysis of the corrinoids yields aminopropanol in amounts approximately identical to that obtained from vitamin $B_{12}$, as shown by paper electrophoresis. No heterocyclic base was observed. The original desmetal corrinoids give no reaction with ninhydrin. Acid hydrolysis of compounds 2, 3 or 4 with 6 N HCl for 6–20 hours at 100° C. yields ninhydrin-reactive components (other than aminopropanol) which are separable by electrophoresis. Compounds 5 does not yield a ninhydrin-reactive component (other than aminopropanol) on acid hydrolysis. Compound 4 gives glutamate as the only amino acid, detected in the amount of 6 ($\pm 1$) moles per mole of corrin. Compounds 2 and 3 yield several amino acids, and predominantly proline. Compound 2, on analysis, gives C, 51.31%; H, 6.68%; N, 14.72%. Compound 4 gives C, 52.57%; H, 6.42%; N, 11.58%.

It has already been shown that corrinoid compounds of this class are useful in preventing the growth of vitamin $B_{12}$-requiring organisms.

What is claimed is:

1. The process for preparing metal-free corrinoid compounds which comprises cultivating at least one metal-free corrin-producing photosynthetic bacterium and extracting and isolating said compounds from the cells of said bacterium.

References Cited

Morita: Archives of Biochemistry and Biophysics, vol. 100 (1963), pp. 302–307.

Klerk: Biochimica et Biophysica Acta, vol. 97 (1965), pp. 275–280.

ALVIN E. TANENHOLTZ, Primary Examiner

U.S. Cl. X.R.

195—96